United States Patent [19]

Hug et al.

[11] Patent Number: 5,601,792
[45] Date of Patent: Feb. 11, 1997

[54] CLEANING EXHAUST GASES FROM COMBUSTION INSTALLATIONS

[76] Inventors: Hans T. Hug, Grabenwiese 87, CH-8484 Weisslingen; Axel Hartenstein, Wolfzangenstrasse 42, CH-8413 Neftenbach; Michael Hug, Hofweg 2, CH-9547 Heiterschen TG, all of Switzerland

[21] Appl. No.: 419,158

[22] Filed: Apr. 10, 1995

Related U.S. Application Data

[62] Division of Ser. No. 20,041, Feb. 19, 1993, Pat. No. 5,431,893.

[30] Foreign Application Priority Data

Feb. 24, 1992 [CH] Switzerland ............. 00556/92

[51] Int. Cl.$^6$ .................................. B01D 50/00
[52] U.S. Cl. .................. 422/169; 422/170; 422/171; 422/172; 422/177; 422/182
[58] Field of Search ........................ 422/168, 169, 422/170, 171, 172, 177, 182; 423/235, 244.09

[56] References Cited

U.S. PATENT DOCUMENTS

| | | |
|---|---|---|
| 4,131,432 | 12/1978 | Sato et al. ............... 422/177 |
| 4,302,431 | 11/1981 | Atsukawa et al. ........ 423/239 |
| 4,963,329 | 10/1990 | Burgess et al. .......... 422/168 |
| 5,252,298 | 10/1993 | Jones ....................... 422/172 |
| 5,281,403 | 1/1994 | Jones ....................... 423/235 |
| 5,318,755 | 6/1994 | Kuivalainen et al. .... 422/171 |

*Primary Examiner*—Jill Warden
*Assistant Examiner*—Krisanne M. Thornton
*Attorney, Agent, or Firm*—Bachman & LaPointe, P.C.

[57] ABSTRACT

An exhaust gas cleaning system includes a pyrolysation channel, a mixing channel downstream of the pyrolysation channel and a reaction channel downstream of the mixing channel. An atomizing nozzle is provided for injecting into the pyrolysation channel an atomized mixture of compressed air and a dilute urea solution. The compressed air and dilute urea solution contacts the exhaust gas stream in the pyrolysation channel wherein the urea decomposes into ammonium and carbon dioxide. Mixers are provided in the mixing channel for forming a homogeneous mixture of the ammonium and carbon dioxide with the exhaust gas. The reaction channel downstream of the mixing channel is provided with at least two catalysts for contacting the homogeneous mixture and removing effluents therefrom.

10 Claims, 10 Drawing Sheets

CLEANING EXHAUST GASES FROM COMBUSTION INSTALLATIONS

This is a Division of application Ser. No. 08/020,041, filed Feb. 19, 1993, now U.S. Pat. No. 5,431,893.

BACKGROUND OF THE INVENTION

The invention relates to a process of cleaning exhaust gases from combustion installations, in particular from diesel, injection and gas/diesel installations, large gas petrol engines, gas turbines and boiler installations which are fired by liquid, gas or solid fuels, through the introduction into the hot flow of exhaust gas of a dilute urea solution of differing concentrations prepared in a reagent tank and an at least single stage catalytic reaction of the toxic, gaseous exhaust gas constituents with a reduction stage or a reduction and an oxidation stage. The invention also relates to an exhaust gas cleaning installation with a reagent tank, a metering and feed device for the dilute urea solution and an electrical control and regulation unit to implement the process.

Catalysts in the exhaust gases of combustion installations are of increasing importance, and in many countries they constitute a necessary prerequisite in order to comply with legal standards.

Combustion installations with maximum levels of efficiency which simultaneously eliminate toxic gases by means of catalysts are the most environmentally friendly and energy-saving. The useful power (level of efficiency) extracted per kilogram of oil or per cubic meter of gas can be decisive in determining whether a system is sensible and environmentally friendly from an energy point of view. Maximum conversion rates of toxic chemicals can only be achieved by the use of catalyst technology.

Catalysts are divided into two main groups:

Three-way catalysts, which are used in operation without excess air, and are not of interest here.

SCR (SCR=Selective Catalytic Reduction) catalysts, which are used in exhaust gas cleaning installations of combustion installations. High nitric oxide values at or below the limits required by the legislators can be achieved with SCR catalysts. For NOx reduction, a reagent is used in addition to a selective reduction catalyst. Ammonia is highly suitable as a reagent, although it is a problematic medium as regards transport, storage and handling. Urea is therefore also used as a substitute for ammonia. This is supplied as a white, dry granulate or as a ready-to-use solution, it is non-toxic, odour-free and poses no problems as regards storage and transport.

In DE,A1 3830045, a process is proposed for the reduction of nitric oxides contained in exhaust gases, in particular those of diesel machines, under oxidation conditions by means of a catalyst containing zeolite, whereby a substance containing urea is added to the exhaust gas as a reduction agent. Metering of the reduction agent may be stoichiometric, under or over-stoichiometric. DE,A1 3830045 aims to create a way of reducing nitric oxides in exhaust gases, avoiding problematic reduction agents, using a catalyst which contains zeolite even where the exhaust gas has a low hydrocarbon content. The catalyst which contains zeolite is therefore of fundamental significance for DE,A1 3830045 corresponding to U.S. Pat. No. 4,946,659.

SUMMARY OF THE INVENTION

The inventors have sought to solve the problem of creating a process for cleaning exhaust gases and an exhaust gas cleaning installation for implementing the process, of the type mentioned at the outset, which guarantees as complete a disintegration as possible of the urea into ammonia and carbon dioxide or its conversion into ammonia, cyanuric acid and carbon dioxide, before the water droplets containing urea come into contact with a hot metal surface in the exhaust gas flow and form unacceptable deposits. No waste products requiring disposal are produced, but virtually exclusively non-toxic gases with the aid of a catalyst which does not contain zeolite, without impairing the high rates of effluent conversion and economically viable operation.

With respect to the process, the problem is solved according to the invention in that in a program controlled exhaust gas cleaning installation, the dilute urea solution added is injected into a pyrolysation channel in a fine spray using a flow of compressed air finely sprayed towards the exhaust gas flow, homogeneously mixed in-line using a mixer located in a mixing channel, and at least the reducible exhaust gas components are converted into non-toxic gases in a reaction channel, using the decomposition product ($NH_3$) of the dilute urea solution in at least one selective reduction catalyst which does not contain zeolite, or additionally the oxidisable exhaust gas components are also converted into non-toxic gases without reagent in at least one oxidation catalyst, to produce a virtually complete reaction. Special and further types of design of the process according to the invention are the subject of dependent patent claims.

By a virtually complete reaction it is understood that toxic gases are converted at a high level of efficiency, preferably greater than 80%, in particular greater than 90%, dependent on substance and temperature.

The dilute urea solution is preferably directed into the exhaust gas flow under a delivery pressure, i.e. under a slight overpressure. The aerosol-type atomization takes place through air with an overpressure of appropriately 0.2 to 8 bar, preferably 0.5 to 6 bar, and in the case of small installations, 0.5 to 1.5 bar. This causes the dilute urea solution flowing out to be entrained and atomized through the injector effect. The exhaust gas channel should preferably be dimensioned such that the exhaust gas preferably flows at a speed of 15 to 60 m/sec.

However the compressed air does not only serve as a means of conveyance, but also as a coolant. The compressed air is carried along the urea conductor in such a way that the temperature of the urea solution in the urea conductor and up to the outlet opening of the nozzle is preferably maintained at a maximum of 100° C. At higher temperatures the urea begins to decompose before atomization of the solution, which is not desirable.

According to a further design form, the dilute urea solution is not only sprayed by the compressed air after leaving the air nozzle which itself produces a twist effect, but is simultaneously rotated. Distribution of the sprayed reagent in the exhaust gas flow is thereby further improved.

In order to achieve an even and complete reaction over the entire cross section of the exhaust gas without any local reagent surplus, the reagent is preferably fed in fully automatically, precisely stoichiometrically proportioned to the NOx mass flow.

After homogeneous mixing in the mixing channel, the exhaust gas flow in the reaction channel, which is homogeneously mixed with the atomized dilute urea solution or its decomposition products, which principally comprise ammonia ($NH_3$), is directed along the many lengthwise channels of the catalysts in a steady flow and in the free reaction channel in a turbulent manner. This may take place both in the reduction stage and in an optional oxidation stage.

With respect to the NOx conversion, the highest possible selective action SCR catalysts are used. Oxidation catalysts may act selectively with respect to the CO, HC and/or $SO_2$ components. Such catalysts are deliberately selected and used.

When switching on the exhaust gas cleaning installation, it is appropriate to first blow in compressed air so that the urea conductor and nozzle are well cooled. Then the dilute urea solution is switched on at the predetermined dosage rate by operating a three-way valve. At the end of the reaction, the flow of dilute urea solution is first interrupted, again by operating the three-way valve. Finally, compressed air is fed to the urea conductor by a further operation and the nozzle is blown clean, in order to avoid the formation of any residues.

The volume of the compressed air flow is measured and monitored. As soon as it falls below a prescribed minimum, the supply of the dilute urea solution is stopped in order to prevent it from entering the exhaust gas flow without being atomized, or else not fully atomized.

Should the nozzle become blocked during the reaction, the pressure increases immediately in the urea conductor and/or in the casing tube for the compressed air. If the level should fall below a prescribed throughput of air or urea solution and/or in the event that a prescribed overpressure is exceeded, then sensors trigger the immediate disconnection of the dilute urea solution supply.

When the reagent supply is switched off, compressed air is immediately fed into the urea conductor and it is blown out. In the event of a stoppage, the pressure gradually increases, for example within 30 seconds, up to the compressor pressure. In normal circumstances the stoppage is blown out during this pressure rise and the nozzle is cleaned. The reagent supply remains switched off until normal conditions are restored.

If the blockage cannot be blown out with compressed air, then simple mechanical means are used for cleaning, as will be shown later.

With respect to the exhaust gas cleaning installation for implementation of the process, the problem is solved using the invention in the following manner:

the feed device is designed as a dual substance nozzle appliance and opens out into the pyrolysation channel, and comprises a reversing valve for the working and blowing out position, a casing tube for the compressed air arranged in the exhaust gas flow area, a urea conductor in the casing tube at a distance and a nozzle for fine spray of the dilute urea solution, at least two cross-blow mixers are fitted at a distance apart in the mixing channel, and at least one honeycomb reduction catalyst designed with lengthwise channels or at least one reduction catalyst and at least one oxidation catalyst are fitted in the reaction channel facing towards the exhaust gas flow. Special and further design forms of the exhaust gas cleaning installation are the subject of dependent patent claims.

A reduction catalyst is always fitted during the process, and an oxidation catalyst is only fitted when required.

The advantages of cleaning exhaust gases according to the invention may be summarised as follows:

No waste products requiring disposal are formed, only non-toxic gases.

Thanks to the dual substance nozzle appliance, the dilute urea solution may be injected in with maximum operating safety, in such a way that the urea decomposes completely. The compressed air acts simultaneously as a transport, cooling and blow-out medium.

The catalysts are recyclable. They may be fitted and removed manually from the catalyst cases without lifting appliances.

The installation may be ideally adapted to suit the spatial conditions, since it is designed extended or compact, horizontal, vertical or diagonal.

The exhaust gases of all combustion processes in engines, boilers and turbines which work with excess oxygen may be cleaned.

The injection appliance operates in a low to medium pressure range, the dilute urea solution is supplied with low conveyance pressure, the compressed air for cooling and spraying is supplied with an excess pressure of only 0.2 to 8 bars.

The injection appliance automatically switches over to self-cleaning with compressed air through the operation of a three-way valve, in the event of a blockage or when work is complete.

The nozzle mixer fitted in the mixing channel is preferably at a distance in the range between $(1.5-2.5) \times d_h$. The hydraulic diameter $d_h$ corresponds to four times the inner surface area of the pipe concerned divided by its circumference. The use of an oxidation catalyst depends on the installation and the exhaust gas concerned, and may be omitted if circumstances and requirements permit.

BRIEF DESCRIPTION OF THE DRAWINGS

The invention is explained in greater detail using the design examples shown in the drawing, which are also the subject matter of dependent patent claims. The diagrams show the following:

FIG. 6 a perspective view of the assembled three channels according to FIGS. 3 to 5, FIG. 7 a perspective view of extended pyrolysation, mixing and reaction channels, FIG. 8 a dual substance nozzle appliance with a three-way valve in the working position, FIG. 9 a dual substance nozzle appliance with a three-way valve in the blow-out position, FIG. 10 an enlarged cross section through a dual substance nozzle head, FIG. 11 a boiler installation, and FIG. 12 a diagram for recording the signal of the urea feed quantity.

DETAILED DESCRIPTION

Figure 1:
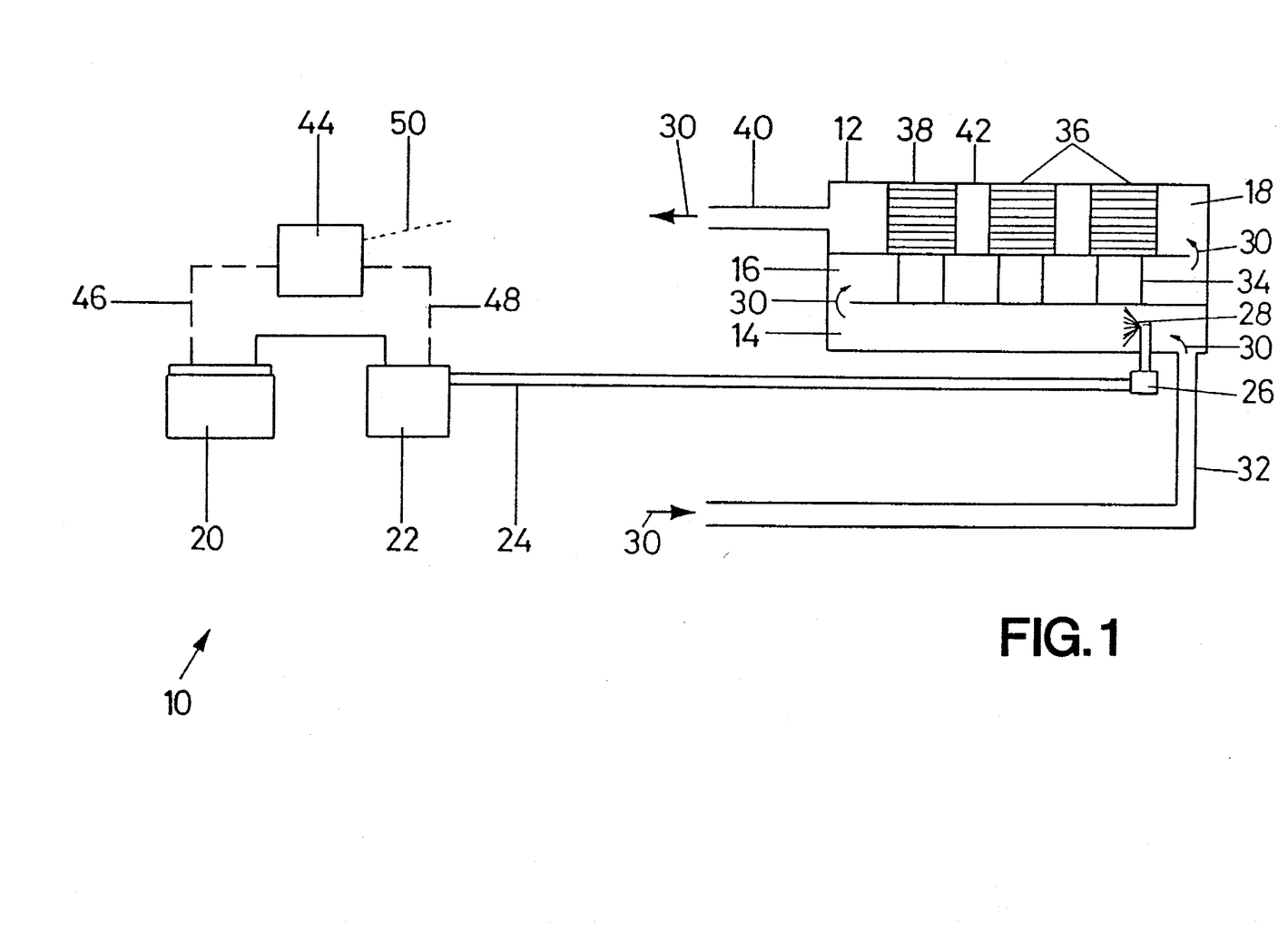
FIG. 1 a cleaning installation with compactly arranged channels.
Figure 2:
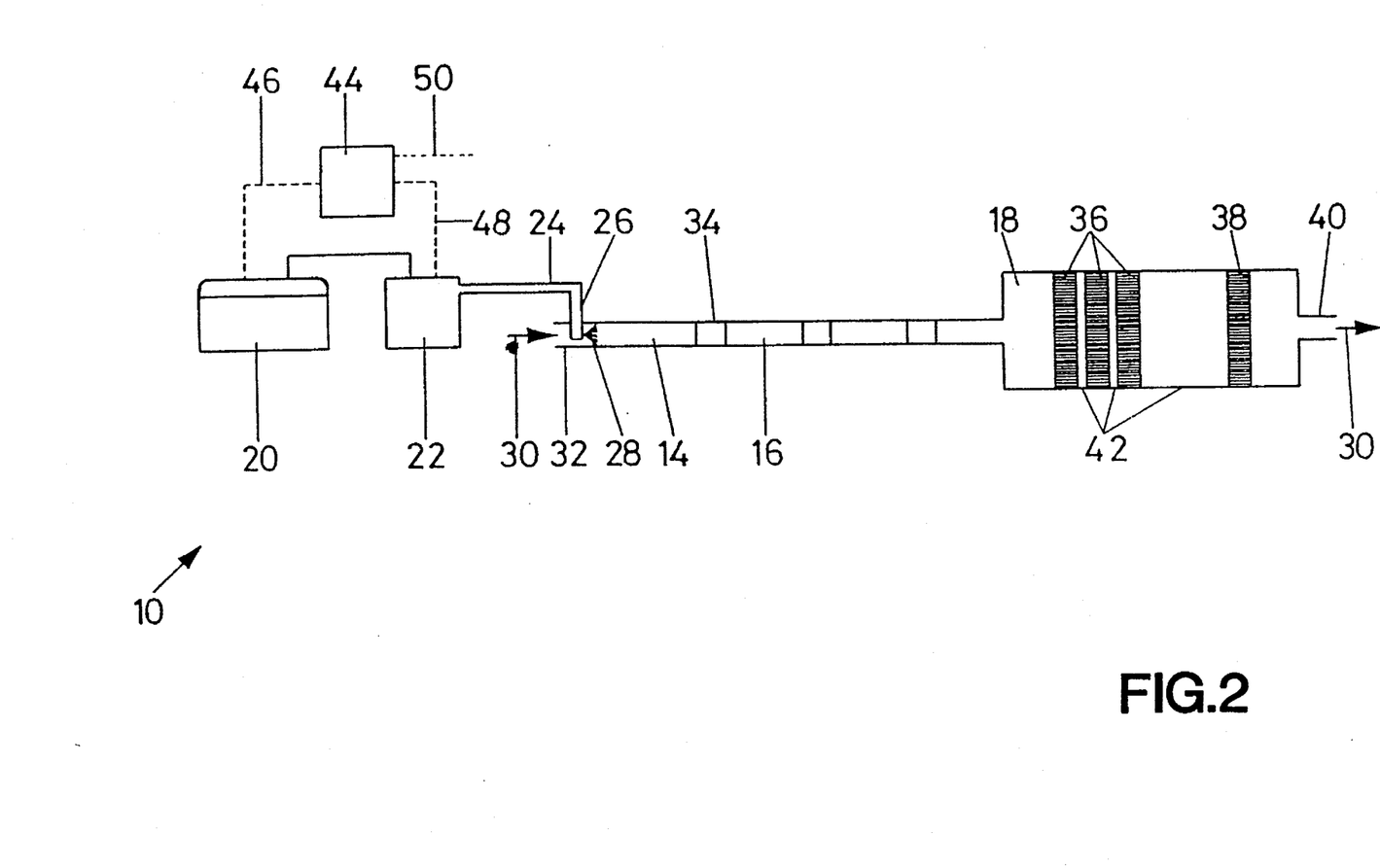
FIG. 2 a cleaning installation with channels arranged in an extended manner.

FIG. 1 shows the first compact option, and FIG. 2 shows a second extended option for an exhaust gas cleaning installation 10 as an overview.

In the compact option according to FIG. 1, three channels are arranged in a housing 12, a pyrolysation channel 14, a mixing channel 16 and a reaction channel 18.

In a tank installation 20 with a reagent tank, a urea granulate with a grain diameter of around 2 mm is dissolved in water in a predetermined concentration and directed to a metering system 22. This sends the dilute urea solution, the reagent, with slight delivery pressure into a urea conductor which is carried coaxially in a casing tube 24. Compressed air at an overpressure of around 1 bar is also supplied in casing tube 24, and flows around the urea conductor. The dilute urea solution and the compressed air are directed into a dual substance nozzle appliance 26, from where they emerge from a nozzle which is shown below in detail and form an aerosol-type atomizing cone 28.

The dual substance nozzle appliance 26 protrudes into the pyrolysation channel 14, where the finely sprayed urea solution is directed into the hot exhaust gas flow 30 which is designated with arrows. The supply line 32 for the crude exhaust gases opens out into the pyrolysation channel 14 in the flow direction directly in front of the dual substance nozzle appliance 26. The pyrolysis, in other words the decomposition of the urea into ammonia and carbon dioxide, if applicable with the formation of cyanuric acid, takes place immediately in the pyrolysation channel 14 and continues until exhausted. The exhaust gas flow 30 with fine particles of ammonia and carbon dioxide subsequently moves into the mixing channel 16 and runs in the opposite direction through three cross-flow mixers 34 of normal construction.

The exhaust gas flow 30 which has now been homogeneously mixed with the decomposed reagent is diverted into the reaction channel, where it is first directed through two reduction catalysts 36 located at a distance from each other, then through an oxidation catalyst 38 of geometrically similar design also located at a distance from the reduction catalysts, which may also be removed thereby excluding the oxidation process. The exhaust gas flow 30 which has now been relieved of all gaseous effluents flows into a heat exchanger or is expelled via a chimney 40.

For the reduction and oxidation catalysts 36, 38 shown, it is indicated that they are of honeycomb structure with channels running lengthwise. A perforated metal sheet 35 as a flow rectifier is fitted before the first reduction catalyst 36. The exhaust gas flow 30 moves in a steady flow in the area of catalysts 36, 38, and in a turbulent fashion in the areas 42 between the catalysts 36, 38. Subsequent mixing takes place in each turbulent zone.

An electrical installation control unit 44 is usually located in a steel cabinet and it monitors and controls all the functions of the installation. The control unit is designed in such a way that the exhaust gas cleaning installation 10 may be operated fully automatically and all systems of the exhaust gas cleaning installation and the control unit of the exhaust gas producing installation communicate with one another automatically. Examples include a tank agitator, a tank heater, temperature and pressure measurement sensors, a tank level probe, a pump, a solenoid valve, a regulator valve, a regulator for the urea solution, a compressed air solenoid valve and a nozzle air compressor.

The reagent regulator valve for the dilute urea solution regulates the electrically measured actual flow value to the prescribed nominal value. The reagent regulator is a microprocessor control for the regulator valve or a metering pump, the engine producing the exhaust gas may be driven at variable power. The flow of urea solution is thus controlled dependent on the power signal according to a freely-programmable NOx mass flow curve. Four different curves may be programmed and requested. The installation control unit is known in the art.

For cleaning exhaust gases from diesel engines, a urea mass flow nominal value curve is programmed as a function of the engine power signal or preferably of the electrical generator power signal. The nominal value curve, also designated the regulation curve, may be calculated and traced on the basis of power points.

The nominal value is compared with the actual value in a regulator and from this a setting signal for the urea regulation is formed. The regulation may be affected by a signal originating purely from NOx measurement on the gas, in such a way that the NOx values are kept at a constant higher level by a slight under-stoichiometric urea proportioning, than would be possible based on the nominal value curve. This prevents too much reagent being fed in when the SCR catalysts age, and thus $NH_3$ slippage occurring. It is important that the nominal value signal from the said regulator operates as an overriding guide signal in order to level out fast load changes in the diesel engine sufficiently quickly. The NOx measurement is too sluggish for this and may only be used on a subordinate basis.

The electrical installation control unit 44 is linked to the said sections of the installation via conductors, for example via a conductor 46, shown as a dashed line, with tank installation 20 and via a conductor 48 with the metering system 22. A conductor 50 is shown dotted, and this replaces all the remaining conductors which lead to the electrical installation control unit 44.

The tank installation 20 which has already been mentioned and is familiar in itself, comprises a plastic reagent tank. A collecting protective trough prevents the urea solution from leaking out if the tank has a leak. The tank is equipped with a water gauge, a mixer and heater for preparing the dilute urea solution. The urea solution level is monitored electrically. In the case of large installations, a large urea solution storage tank is supplemented by a transfer pump system and a urea solution tank for every day use.

The metering system 22 for the urea solution is preferably arranged in an enclosed machine cabinet and comprises the following components: filter, urea solution pump, pressure maintenance valve, electrical urea solution regulation valve, urea solution pressure measurement, electrical urea solution throughput measurement, optical reagent measurement, solenoid valve, jet air compressor with suction filter, compressed air filter, pressure measurement, compressed air throughput monitoring. The installation control unit may also be memory-programmable (stored-programmable control unit).

The hydraulic and pneumatic connections to the dual substance nozzle appliance 26 and to the tank installation 20 are produced by means of hoses, stainless steel or aluminium pipes.

All the details mentioned with respect to the tank installation 20, the metering system 22 and the electrical installation control unit 44 are familiar in themselves and not therefore shown in the drawings.

According to the design shown in FIG. 2, the exhaust gas flow 30 is taken as in FIG. 1 in-line through a pyrolysation channel 14, a mixing channel 16 and a reaction channel 18. In FIG. 2 these channels are however not arranged in compact fashion, but extended. The urea solution is injected as a fine atomising cone 28 towards the exhaust gas flow 30 into the pyrolysation channel 14, flows via three cross-flow mixers 34 through the mixing channel 16 and is directed in the reaction channel 18 of an essentially larger cross section initially through three reduction catalysts 36 and then through an oxidation catalyst 38.

The tank installation 20, the metering system 22 and the electrical installation control unit 44 are as shown in FIG. 1.

Figure 3:
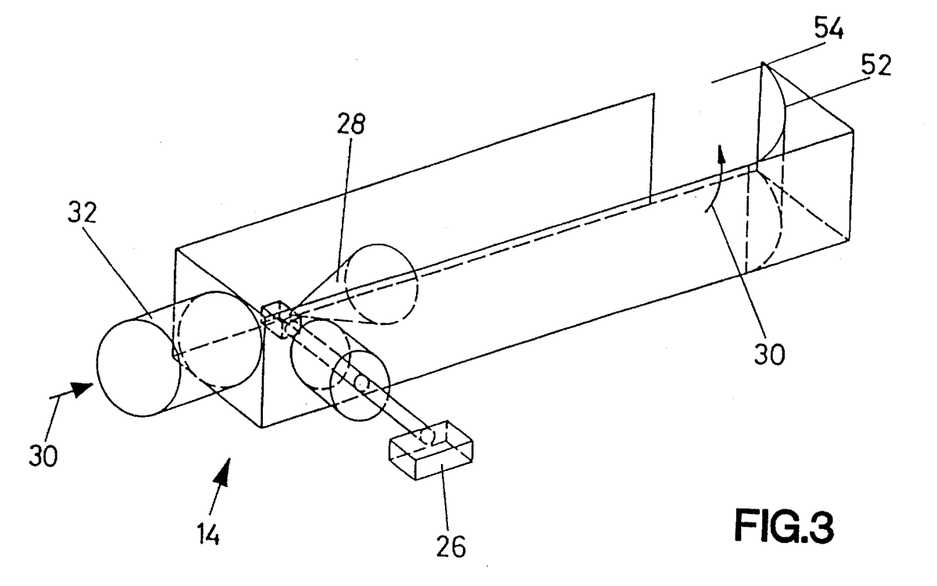
FIG. 3 a perspective view of a pyrolysation channel.

FIG. 3 shows a pyrolysation channel 14 in perspective view, with the cover removed. The exhaust gas flow 30 is directed in from the front via a feed pipe 32. The dual substance nozzle appliance 26 is flange-connected adjacent to this end, whereby the nozzle projects into the inside of the pyrolisation channel 14. The dual substance nozzle appliance 26 will be described in detail later.

Figure 6:
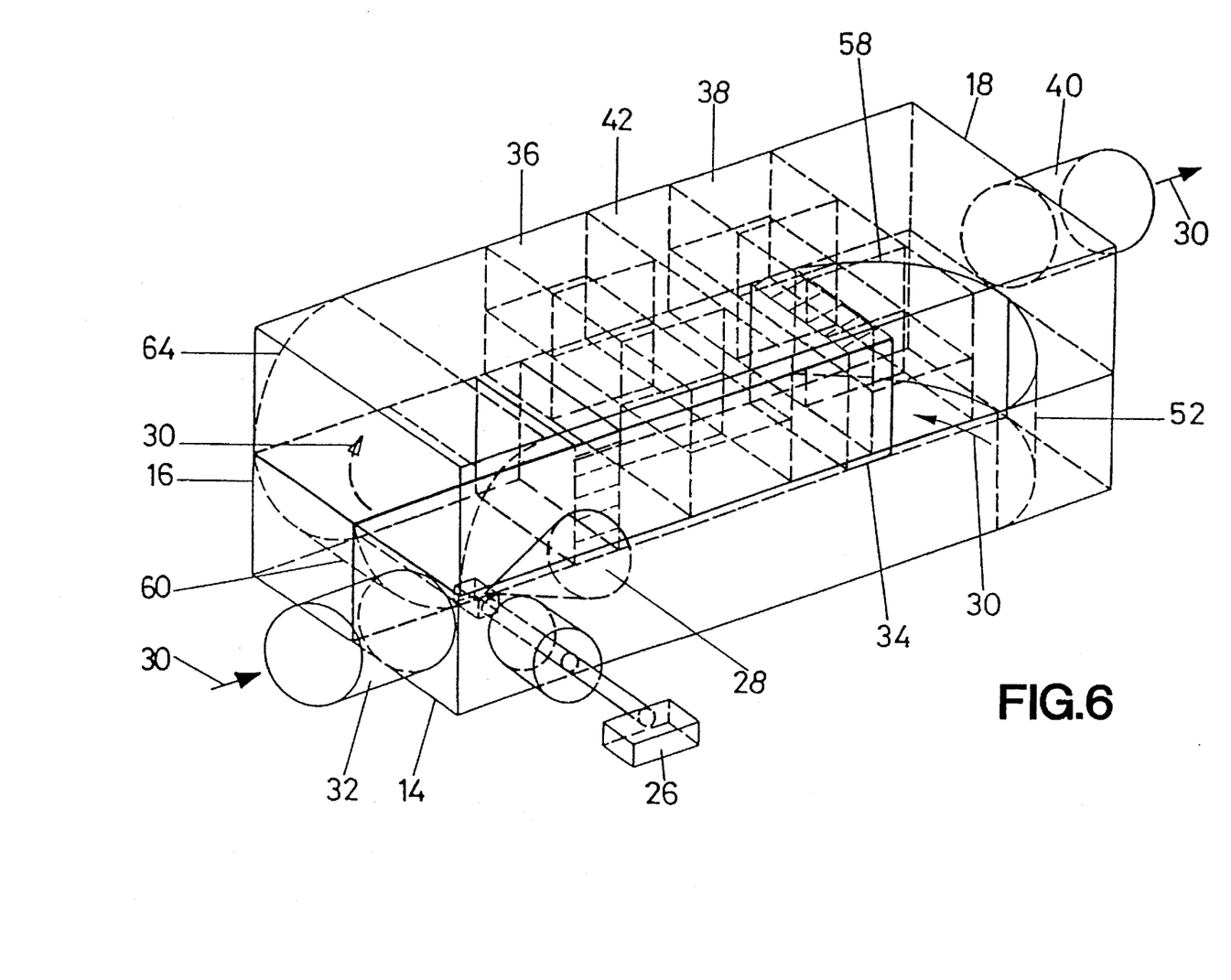

It is again shown that the atomizing cone 28 of the fine urea solution is injected towards the exhaust gas flow 30. The urea solution decomposes immediately and completely in the hot exhaust gas flow 30 as described above. The exhaust gas flow 30 is diverted on a baffle plate 52 towards an outlet opening 54 as shown in FIG. 6 into the mixing channel shown in the next FIG. 4. The gas flow 30 flows over an inlet opening 56, guided by a baffle plate 58, which is flush with the baffle plate 52 according to FIG. 3, into the mixing channel 16. Two nozzle mixers are arranged in this channel. The exhaust gas flow 30 must flow through the cross-flow mixer 34 and cannot penetrate through along the walls of mixing channel 16.

Figure 4:
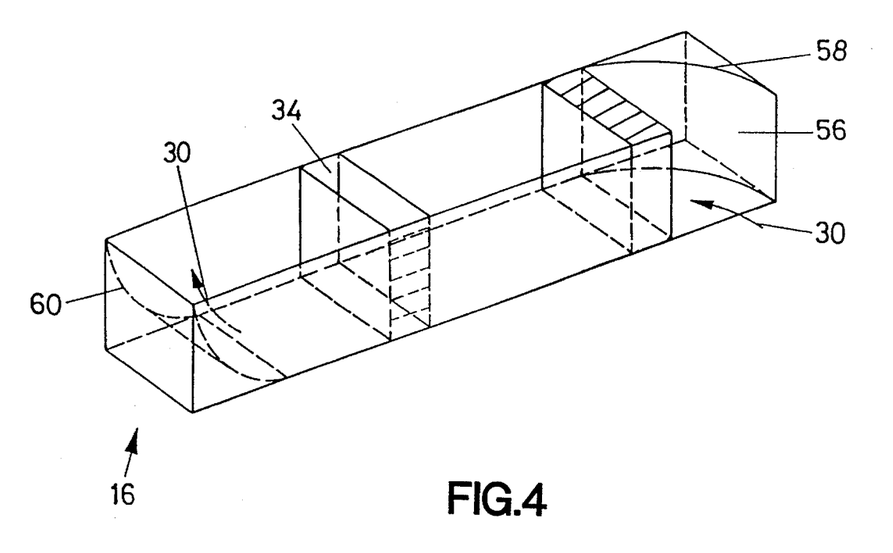
FIG. 4 a perspective view of a mixing channel.

The exhaust gas flow 30 is diverted upwards via a further baffle plate 60. This baffle plate 60, together with all the other baffle plates, may be replaced by other suitable means or omitted altogether.

Figures 5, 5A:
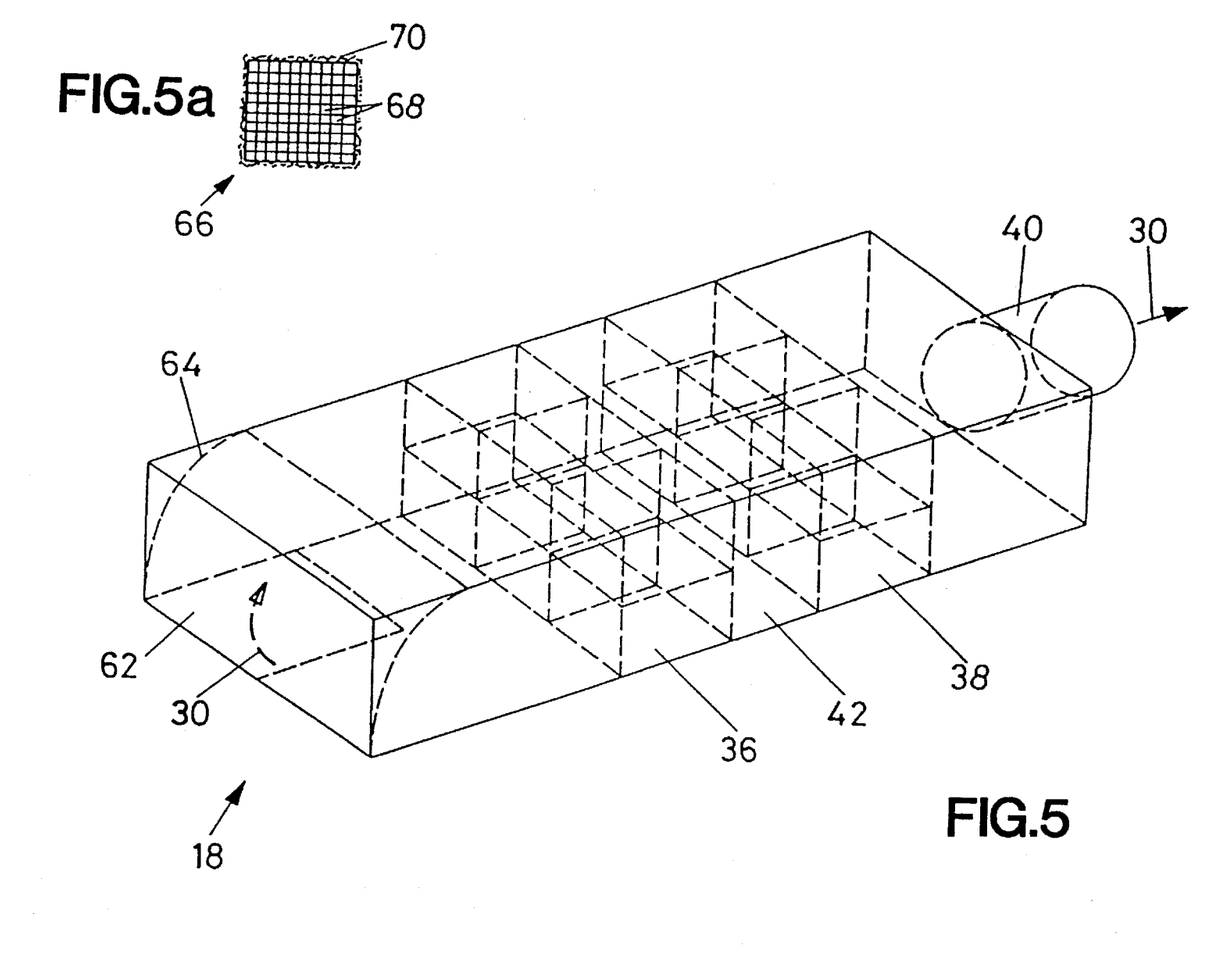
FIG. 5 a perspective view of a reaction channel.
FIG. 5a a view of a honeycomb element.

The pyrolysation channel 14 which is open at the top and the mixing channel 16 are covered with a reaction channel 18 which extends over both channels, as shown in FIG. 5, with the exception of an inlet opening 62. The exhaust gas flow 30 is diverted to the horizontal again with a baffle plate 64 which extends over the entire width of the reaction channel 18, and initially flows through a reduction catalyst 36 and then an oxidation catalyst 38. The cleaned exhaust gas flow 30 is expelled to the open air via a tube-shaped chimney 40.

A dashed line indicates that the catalysts 36 and 38 are arranged in modular fashion, in this embodiment they each comprise six honeycomb elements. One module for example has a cross section of 150×150 mm and is 50, 150 or 300 mm long. Several honeycomb elements may be arranged adjacently, on top of one another and/or behind one another.

The lengthwise channels are appropriately designed square, with side lengths of 2 to 8 mm. Thus a steady flow may be produced along the lengthwise channels.

The number, arrangement and length of the modules is determined on the basis of both technical and financial factors. Modules which are too large can lead to considerable manufacturing problems.

In the reduction stage, the extruded honeycomb elements are for example made of titanium, tungsten or vanadium oxide, or else an inert basic structure is coated with at least one of these materials. Apart from the catalyst composition, the channel opening and the number of channels, the web width and the number of rows of honeycomb elements may vary according to the design.

The reagents nitric oxide, ammonia and oxygen from the exhaust gas flow 30 which flows steadily through the lengthwise channels of the honeycomb structures reach the fine-pored structure of the honeycomb walls through diffusion and adsorption, and react there on the active centres through selective catalytic reduction. The reaction products are water, nitrogen and carbon dioxide.

The catalyst gradually loses its activity over a long operational period through pore blockage and/or catalyst toxins which destroy the active centres. When a minimum level of activity is reached, the catalyst honeycomb elements are replaced and recycled. The loss of activity and the timing of replacement may be calculated.

The oxidation catalysts 38 comprise extruded honeycomb elements with ceramic basic structure, into the surface of which a catalytically active precious metal, for example platinum, rhodium and/or palladium, is embedded. The geometry of the honeycomb elements and the type of active coating may be selected for the specific application.

In contrast to the selective reduction process, the oxidation proceeds without any supplementary reagent. The oxidation catalyst causes the oxidisable gaseous toxic exhaust gases to burn flamelessly even at very low concentration and well below the self-combustion temperature. For this oxidation process it is necessary that the exhaust gas must contain a minimum proportion of residual oxygen. The reaction products of the oxidation are carbon dioxide and water.

The transport of the gas molecules to be oxidised from the lengthwise honeycomb channel into the active coating takes place, as in the case of the selective catalytic reduction catalysts, by diffusion, caused by the reduction in concentration in the area of the active coating.

The oxidation catalyst is also subject to ageing, it gradually loses its activity as a result of catalyst toxins and coatings. Once it has reached a minimum level of activity, the catalyst honeycomb elements are replaced and recycled.

FIG. 5a shows a front view of a honeycomb element 66, which is designated a module for reduction or oxidation catalysts 36, 38. The square lengthwise channels 68 have an inside width of 4 to 64 $mm^2$, dependent on their number per module cross section area, in this case 15 $mm^2$.

The honeycomb element 66 is sheathed more or less flush with its length by an elastic hose 70 made of knitted or woven glass fibres. This hose 70 serves firstly to protect it against impacts and secondly seals the adjacent honeycomb elements 66, which prevents the exhaust gas flow 30 from flowing through adjacent to the honeycomb or lengthwise channels 68.

According to further design variations (not shown but clearly contemplated from consideration of FIGS. 3–7), the pyrolysis channel 14 and the mixing channel 16 for example may be designed extended, and then the exhaust gas flow 30 may be diverted into a reaction channel lying on top of the mixing channel 16 (semi-compact). Also in a compact design, the pyrolysation channel 14 may be arranged on top and the reaction channel 18 underneath. Some or all of the channels may run in a direction other than horizontal, e.g. vertical. The inlet for the exhaust gas flow 30 may be from the right or left, top or bottom, as may the outlet for the cleaned exhaust gases.

Figure 7:
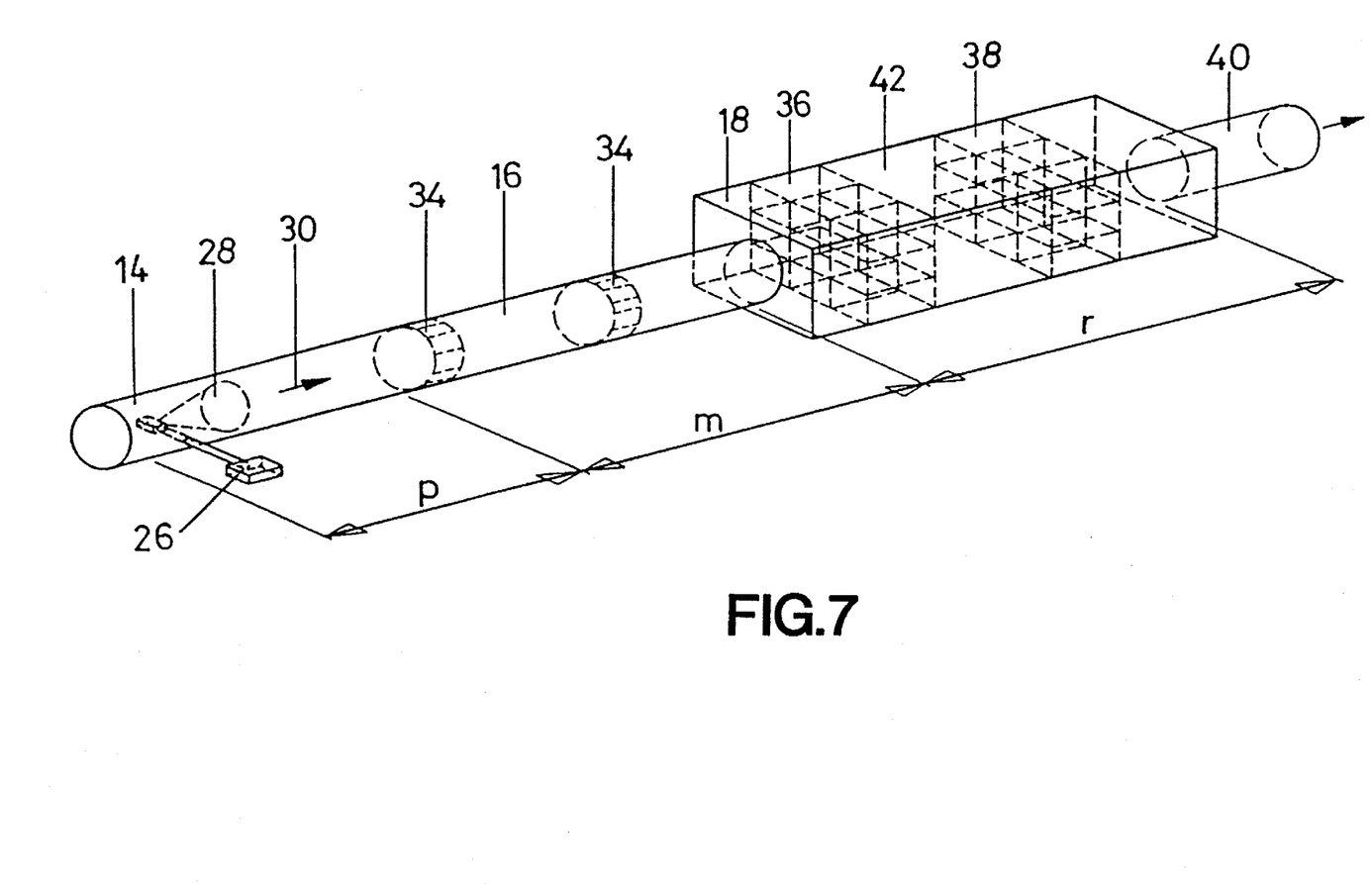

The design form according to FIG. 7 is essentially the same as that in FIG. 6, however the pyrolysation channel 14, the mixing channel 16 and the reaction channel 18 are not designed compact, but extended. P designates the pyrolysation segment, m the mixing segment and r the reaction segment.

Figure 8:
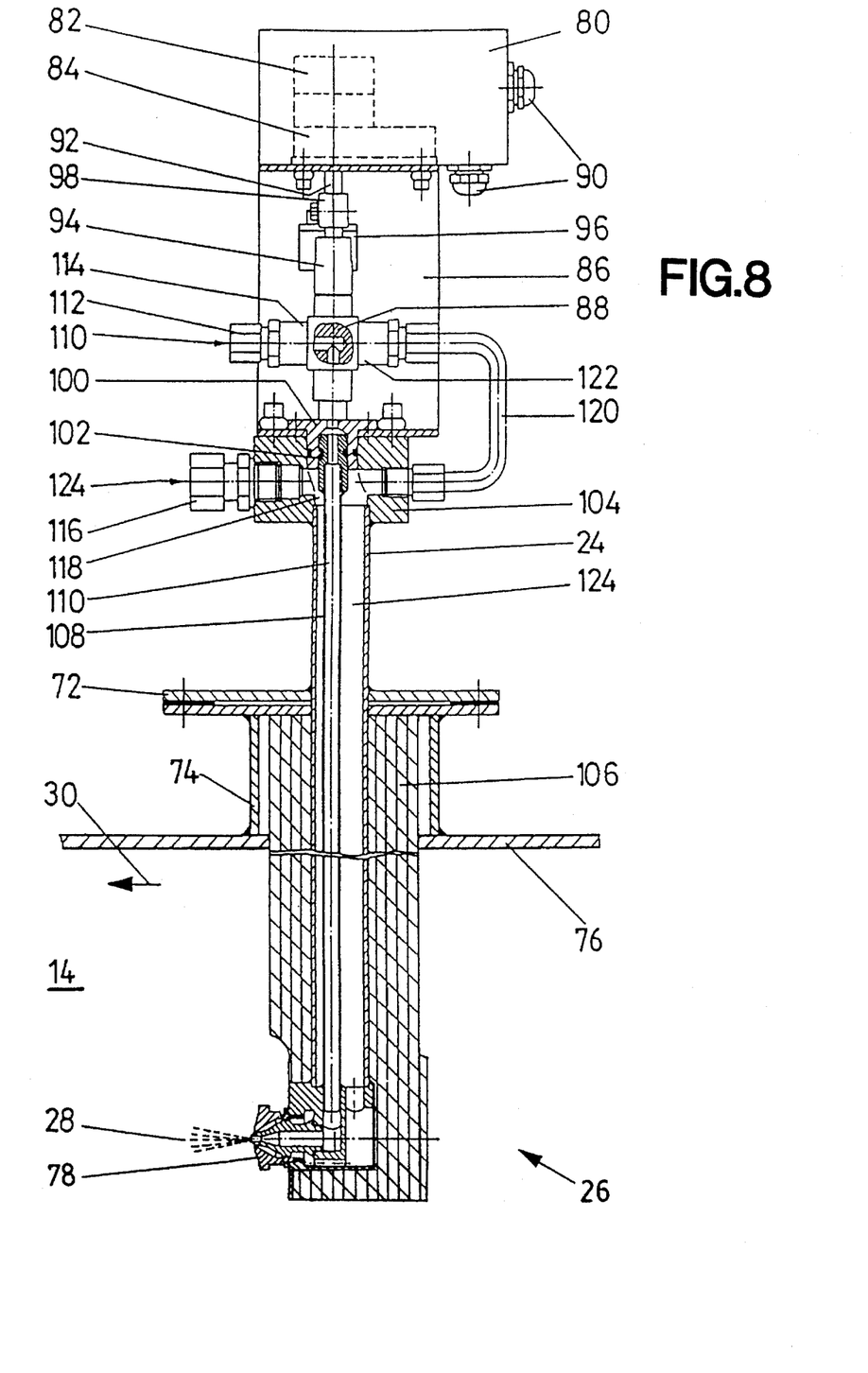

A soot filter, not shown, made for example of aluminium oxide, glass or ceramic fibres, may be connected before the pyrolysation channel 14 with the dual substance nozzle appliance 26, as in all other design options. FIG. 8 shows a dual substance nozzle appliance 26, which is connected direct (FIG. 9) or via a flange 72 and a retaining bracket 74 with the wall 76 of the pyrolysation channel 14 (FIGS. 1, 2).

Figure 10:
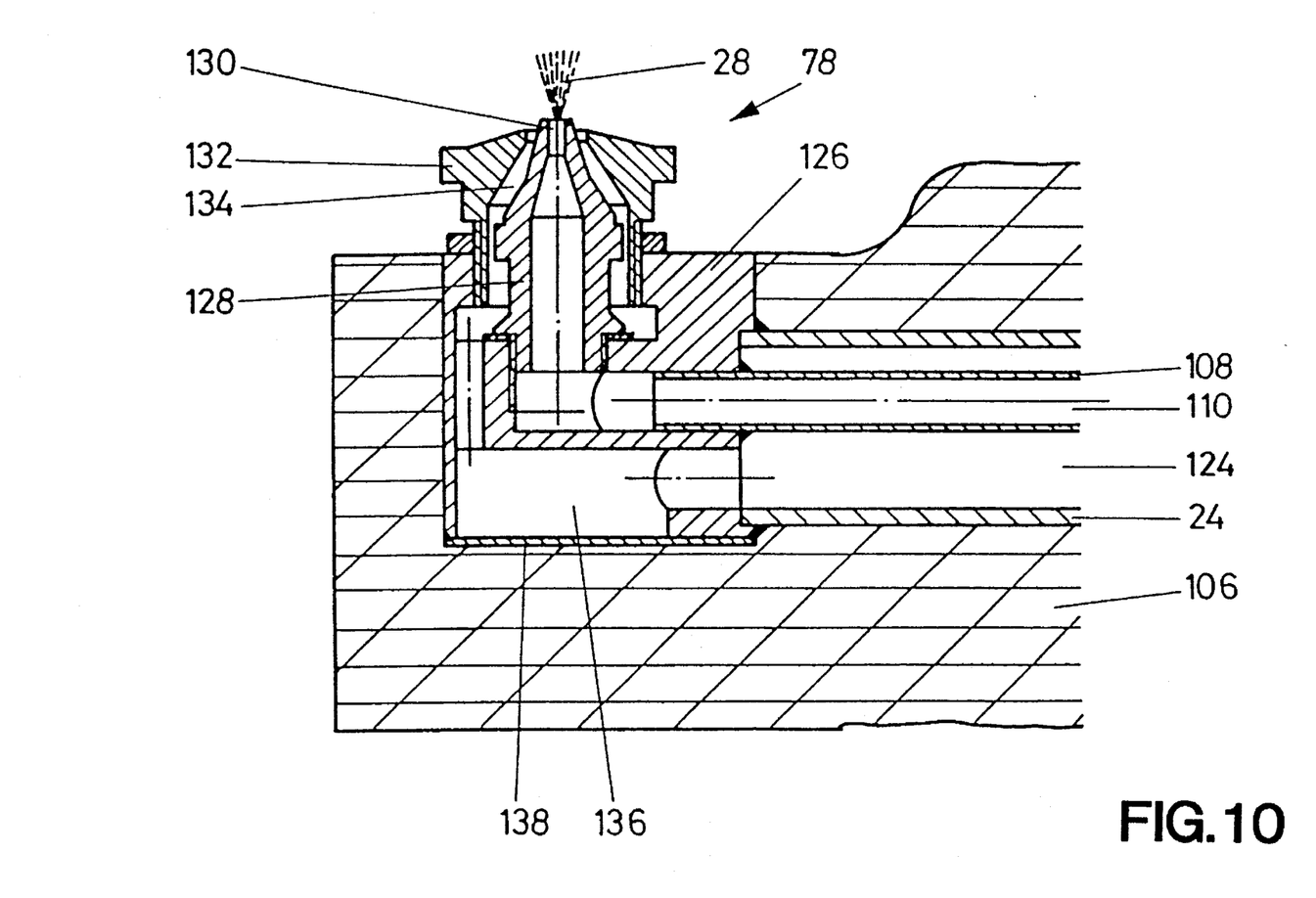

A two-part nozzle 78 with the atomising cone 28 as mentioned is shown in detail in FIG. 10.

Figure 9:
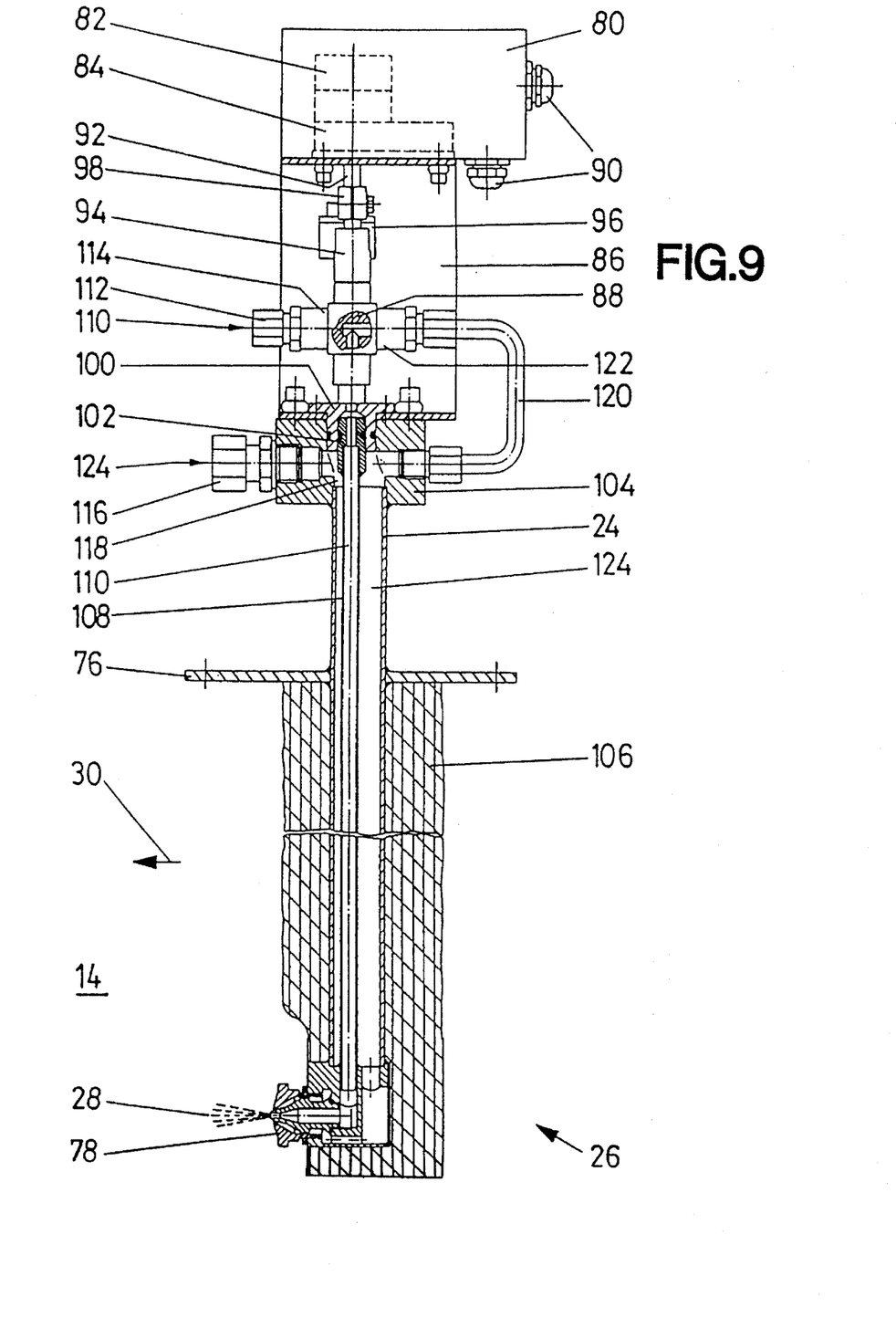

A removable valve part according to FIGS. 8, 9 essentially comprises an engine housing 80 with a servomotor 82, a synchronous motor and an adjustment gear 84 and a valve housing 86 with a three-way ball valve 88 with the corresponding supply lines.

The electrical conductors not shown are brought in via cable plug screw connections 90. The servomotor 82 acts on the three-way ball valve via a motor shaft 92 and a coupling 94, fitted with contact lever 96 and limit switch 98.

A retaining flange 100 with coaxial pipe holder 102 and support ring 104 is screwed to the valve housing 86. Retaining flange 100, pipe holder 102 and support ring 104 are sealed from one another with O-rings.

The casing tube 24 which leads into the area of nozzle 78 and which is connected with the flange 72 or the wall 76 of the pyrolysation channel, is welded to the support ring 104. The casing tube 24 in this case is sheathed with an insulation layer 106 which is stripped off in the area of nozzle 78, in the area of the hot exhaust gas flow 30. The insulation layer 106 may be omitted completely or in part.

The urea conductor 108, fixed in the pipe holder, runs inside the casing tube 24 at a distance therefrom, preferably coaxially.

The urea solution 110 is directed with low delivery pressure via a screw connection 112 and via a connection 114 which leads to the three-way ball valve 88.

The compressed air 124 is introduced via a screw connection 116, which leads to a cavity 118 in the support ring 104. This cavity 118 is connected via a compressed air line 120 with a connecting piece 122 which is diametrically opposite the inflow connecting piece 114 for the urea solution with respect to the three-way valve.

FIG. 8 shows the three-way ball valve 88 in its working position, it is open in the direction of the inflowing urea solution 110. The urea solution 110 may flow in the direction of the pipe holder 102 and may be directed to the nozzle 78 via the urea conductor 108. The compressed air 124 flows into cavity 118 and there, continuously surrounding the urea conductor 108 as a coolant, flows in casing tube 24 to nozzle 78. No air may flow through compressed air line 120, because the three-way ball valve 88 is closed.

In FIG. 9, the three-way ball valve 88 is in the blow out position. The supply of urea solution 110 is interrupted, the compressed air may now flow into the urea conductor via the compressed air line 120 and the three-way ball valve 88 and may blow it out.

The nozzle 78 shown in FIG. 10 comprises a nozzle body 128 which is screwed into a nozzle head 126 with a narrowing outlet opening 130 for the urea solution 110. A nozzle cap 132 is screwed over nozzle body 128, and these nozzle parts form outlet channels 134 for the compressed air 124. The compressed air emerging causes an aerosol-type atomization of the dilute urea solution through the injector effect.

An air space 136, limited by a nozzle head cover 138, is formed under nozzle 78, which continues in the direction of the outlet channels 134 and is sealed with suitable means.

In the area of the outlet channels 134, a rotating movement of the emerging compressed air 124 may be caused by means of inclined grooves, inclined channels or other known means.

If a blockage of nozzle 78 and/or of the urea conductor cannot be blown out using compressed air 124, then the nozzle cap 132, possibly nozzle body 128 and if necessary also the valve part of the retaining flange 100 may be unscrewed for mechanical cleaning.

Figure 11:
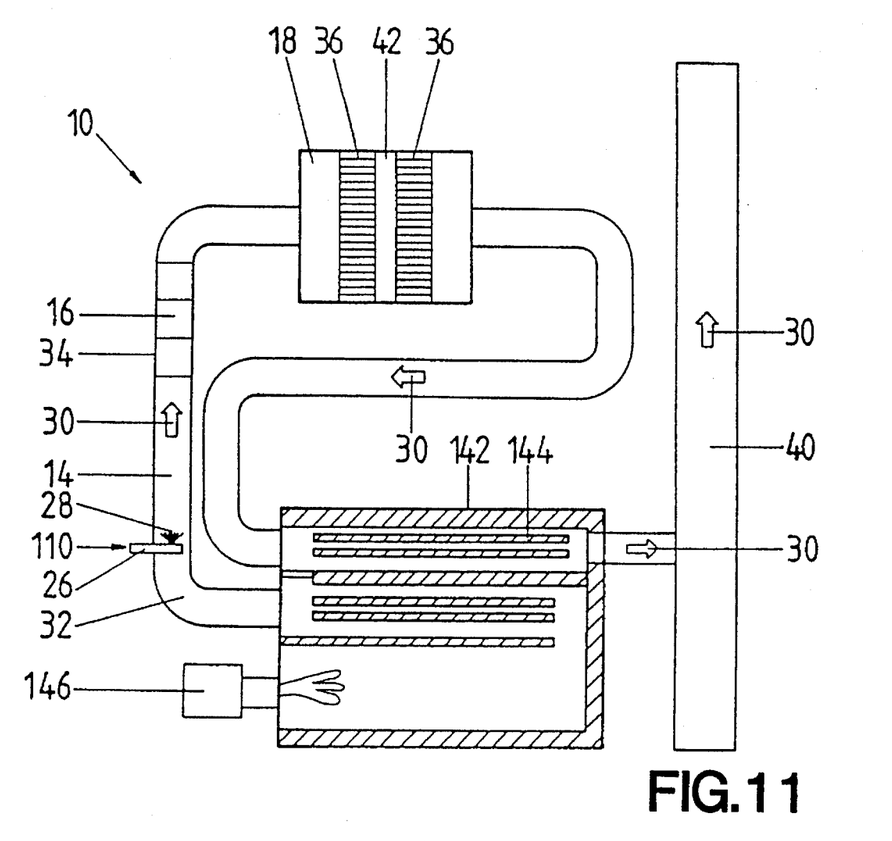

FIG. 11 shows a boiler unit 140 with an exhaust gas cleaning installation 10 mounted outside the boiler body 142, which essentially comprises a pyrolysation channel 14 with a dual substance nozzle appliance 26, a mixing channel 16 and a reaction channel 18 without oxidation catalyst. The exhaust gas flow 30 which is freed of toxic gases is directed into a chimney 40 through the boiler body 142 with a heat exchanger 144. For precipitation of fine particles suspended in the exhaust gas flow 30, the exhaust gas flow may first be directed through a fan or similar, which is not shown.

When operating a boiler or other combustion units with sulphurous fuels, e.g. heavy fuel oil, minimum operating temperatures which depend on the sulphur content must be observed. If temperatures are too low, ammonium sulphate is formed, which firstly coats the catalyst with an adhesive, viscous layer and secondly is highly corrosive. The following minimum temperatures have been determined, which are reached by a suitable burner unit 146, by means of heat exchangers and/or positioning of the exhaust gas cleaning installation 10 outside or inside the boiler body 142:

0.05% in weight sulphur=513° K
0.15% in weight sulphur=533° K
0.3% in weight sulphur=553° K
0.5% in weight sulphur=563° K
1% in weight sulphur=573° K
1.5% in weight sulphur=613° K
2% in weight sulphur=623° K
3% in weight sulphur=693° K
4% in weight sulphur=713° K The minimum temperatures may also be increased by mixing hotter exhaust gases from the boiler, before bringing the catalyst into use. The mixed-in exhaust gas flow should always be smaller or at least of the same size as the main exhaust gas flow. The exhaust gas flow may be continuously regulated by a motor-driven valve. The temperature may be recorded by means of a thermostat, which gives a signal to the regulator.

Figure 12:
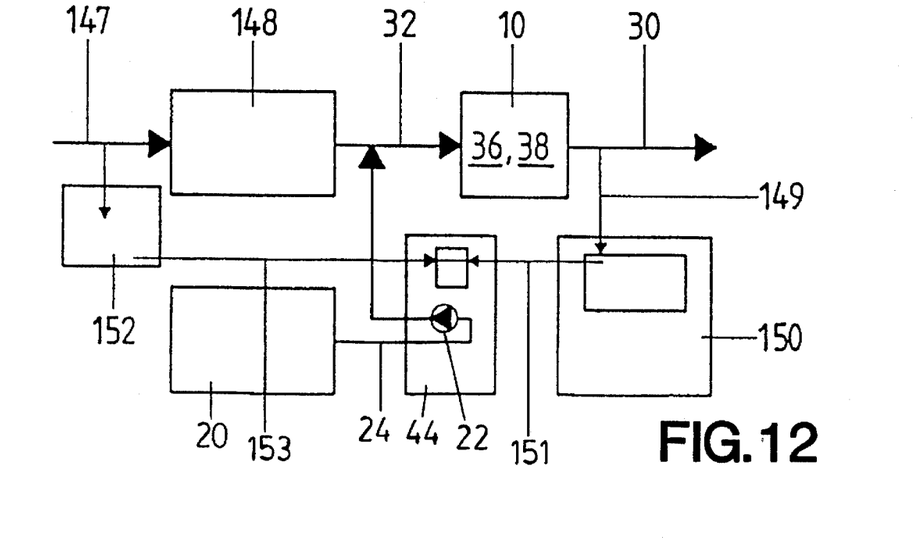

FIG. 12 shows a diagram of the signal recording for the urea metering quantity. Fuel 147 is directed to a combustion installation 148, as shown with an arrow. The uncleaned exhaust gases are directed via a line 32 to an exhaust gas cleaning installation 10 with a reduction catalyst 36 or a reduction catalyst and an oxidation catalyst 38, and the exhaust gas flow 30 cleaned of toxic gases emanates from this installation. From a tank installation 20 shown in more detail in FIG. 1, the reagent is directed into the exhaust gas cleaning installation 10 via a regulator of the electrical installation control unit 44, with a metering system 22 and a casing tube 24.

The regulation signals or their conductors from the electrical installation control unit 44 are not shown, they may be taken from FIGS. 1 and 2.

In the case of solid fuels 147, a line 149 branches to a gas analysis instrument 150 for chemical/physical analysis of the pipe with the cleaned exhaust gas flow 30 leading to a heat exchanger or a chimney. This produces signals in a known manner, which are directed to the electrical installation control unit 44 via an electrical conductor 151.

In the case of liquid or gas fuels 147, this is recorded using a physical measuring instrument 152, which also produces signals and passes them to the electrical installation control unit 44, the regulator, via a further electrical conductor 153.

As the reduction of nitrous oxides in the exhaust gas 30 of combustion installations 148 with excess oxygen only takes place by the proportioned supply of dilute urea solution 110 (FIGS. 8, 9), the nominal value of the supply quantity must be recorded. The level of efficiency of the exhaust gas cleaning installation 10 depends on the precise recording of the input signal of the toxic gases to be eliminated from the exhaust gas flow 30. If the recording is undertaken by a gas analysis measuring instrument 150, which measures the toxic gas, then the level of efficiency of the exhaust gas cleaning installation 10 is mainly determined by the measurement accuracy of this measuring instrument and its constancy over time. In the case of gas analysis, several physical parameters of the individual gas concerned and their cross-sensitivity to further individual gases and the physical values must be determined for precise chemical and physical definition of the actual value.

In the case of oil or gas-fired combustion installations 148, the fuel constituents are largely constant and thus directly proportional to their exhaust gas components. The nominal value for the addition of the reduction agent, the dilute urea solution, may be based on the signals transmitted by the physical measuring instrument 152, and the gas analysis measuring instrument 150 is not needed.

If recording takes place via the physical measuring instrument 152 by means of a meter or a potentiometer, the signal recorded may be used as an actual value for the addition of the dilute urea solution. The actual value signal may be transferred direct or with an electrical converter as a 0–20 mA or 4–20 mA signal to the electrical installation control unit 44 or to an actuator which is not shown. Without recalibration, the error limit after six months should not exceed ±2%.

The dependence of the development of toxic gases on non-fuel-related actual values is assessed by periodic gas analysis measurement. An actuator may be triggered by the input into the electrical installation control unit 44 of a group of curves of the regulation parameters thus recorded.

The fuel data and non-fuel-related data are recorded as described and fed into the regulation unit 44, which acts on actuators. The electrical signals may directly trigger a permanently regulated pump, and be input as a nominal value, instead of triggering the regulation unit 44. A gas analysis signal may additionally be adapted to an actual value signal.

Solid fuels have varying fuel constituents. They are burned in combustion installations 148 with large furnace bodies. The yield of the solid matter and the consumption can scarcely be properly determined, or at least cannot be determined in a homogeneous manner. The quantity of toxic constituents in the exhaust gas flow is also variable, in accordance with the variable fuel composition. The fuel quantity is therefore not suitable as an actual value signal for the reagent flow. As a constant signal, the volume flow of the combustion air is recorded as a physical value. The physical measuring instrument 152 and a continuous measurement gas analysis instrument 150 record the nitric oxide content in ppm. Both signals are recorded via a computer as nitrous oxide mass flow and are used as an actual value for the metering of dilute urea solution, via a 0 to 20 mA or 4 to 20 mA analog signal.

We claim:

1. In an exhaust gas cleaning system having a reagent tank supplying a dilute urea solution, a metering system downstream of said reagent tank for metering the dilute urea solution, and a supply and atomization device for feeding the dilute urea solution to a plant for treating the exhaust gases, the improvement comprising:

the plant comprises a pyrolysation channel, a mixing channel downstream of the pyrolysation channel and a reaction channel downstream of the mixing channel;

the supply and atomization device comprises first pipe means for transporting compressed air and a second pipe means within said first pipe means for transporting the aqueous urea solution wherein the second pipe means is spaced from the first pipe means, and an atomization nozzle for receiving the compressed air and aqueous urea solution for atomizing same into the pyrolysation channel;

at least two cross-flow mixers located in the mixing channel at a spaced distance from each other;

at least two catalyst means located within the reaction channel at a spaced distance, said at least two catalyst means comprises a reduction catalyst followed by an oxidation catalyst; and means for feeding the exhaust gas to the pyrolysation channel wherein the exhaust gas mixes with the atomized aqueous urea solution to form a mixture which passes sequentially through the mixing channel and the reaction channel where it contacts the at least two cross-flow mixers and the at least two catalyst means respectively.

2. Exhaust gas cleaning system according to claim 1 wherein the nozzle has means for twisting and rotating the compressed air.

3. Exhaust gas cleaning system according to claim 2 wherein the nozzle has an electronically controlled operable three-way ball valve for disconnecting the supply of aqueous urea solution and for simultaneously connecting the second pipe with the first pipe.

4. Exhaust gas cleaning system according to claim 1 wherein the pyrolysation channel, mixer channel and reaction channel are arranged in a stacked rectangular shape next to each other and each are formed with guide plates for directing air flow.

5. Exhaust gas cleaning system according to claim 1 wherein the at least two catalyst means incorporated in the reaction channel are honeycomb bodies with a polygonal cross-section, wherein a perforated plate as a flow rectifier is located upstream thereof.

6. Exhaust gas cleaning system according to claim 5 wherein the honeycomb bodies have a cross-section of approximately 150×150 mm and are arranged serially.

7. Exhaust gas cleaning system according to claim 5 wherein the honeycomb bodies are covered longitudinally with an elastic fire-resistant material.

8. Exhaust gas cleaning system according to claim 1 wherein the at least two catalyst means includes a reduction catalyst selected from the group consisting of titanium, tungsten, vanadium and mixtures thereof, and an oxidation catalyst which consists of a precious metal.

9. A device for removing effluents from an exhaust gas stream comprises:

a pyrolysation channel for transporting an exhaust gas stream along a first direction;

a source of a dilute urea solution and compressed air;

means for injecting into the exhaust gas stream in the pyrolysation channel an aerosol mixture of said dilute urea and compressed air wherein said urea decomposes into ammonium and carbon dioxide;

cross-flow mixing means for forming a homogeneous mixture of the exhaust gas with the ammonia and carbon dioxide; and catalyst means downstream of the mixing means for removing effluents from the homogeneous mixture said catalyst means comprises a reduction catalyst followed by an oxidation catalyst wherein said oxidation catalyst is spaced from said reduction catalyst.

10. A device according to claim 9 including means for controlling the temperature of the dilute urea solution so as to prohibit decomposition of the urea prior to injection into the pyrolysation channel.

* * * * *